United States Patent Office 3,574,717
Patented Apr. 13, 1971

3,574,717
PROCESS FOR THE PRODUCTION OF
UNSATURATED ORGANIC COMPOUNDS
John Edward Lloyd, Norton-on-Tees, England, assignor to Imperial Chemical Industries Limited, London, England
No Drawing. Filed Mar. 27, 1967, Ser. No. 625,948
Claims priority, application Great Britain, Apr. 7, 1966, 15,653/66
Int. Cl. C07c 67/04
U.S. Cl. 260—497
12 Claims

ABSTRACT OF THE DISCLOSURE

Allene and substituted allenes react with certain specified nucleophiles including carboxylic acids, alcohols, water and hydrogen cyanide in the presence of a Group VIII noble metal salt catalyst, e.g., palladous acetate to give allyl and isopropenyl derivatives. The reaction may be carried out in the presence of a redox system such as a copper salt which may optionally be regenerated by means of molecular oxygen.

---

The present invention relates to the production of unsaturated organic compounds.

According to the invention unsaturated organic compounds are produced by a process which comprises reacting a compound of formula HX with an allene compound of formula

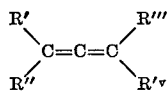

in the presence of a salt or complex of a noble metal of Group VIII of the Periodic Table, in which:

X is a nucleophilic element or group as hereinafter defined and R', R", R''' and R'$^v$ which may be the same or different are organic or inorganic substituent groups.

In the formula HX, X may be organic or inorganic in nature. The inorganic forms of HX are water HOH, ammonia HNH$_2$, and hydrogen cyanide HCN. The organic forms of HX are monohydric, dihydric and polyhydric alcohols and phenols, carboxylic acids, mercaptans and primary and secondary amines. Examples of suitable phenols are phenol itself, cresols and xylenols. Aliphatic alcohols containing 1 to 20 carbon atoms are very suitable, particularly aliphatic and cycloaliphatic alcohols containing 1 to 13 carbon atoms, for example methanol, isobutanol, cyclohexanol, ethylene and propylene glycols, glycerol and alcohols containing 8 to 13 carbon atoms made by the "OXO" process. Preferred organic forms of HX are the carboxylic acids, both aliphatic and aromatic. Benzoic acid and the phthalic acids, particularly terephthalic acid are examples of suitable aromatic acids. Aliphatic carboxylic acids containing 1 to 20 carbon atoms are particularly useful forms of HX, aliphatic carboxylic acids containing 1 to 6 carbon atoms, especially acetic acid, being preferred. Mono- and dimethylamine and mono- and diethylamine are examples of suitable amines for use in the process.

When HX is a carboxylic acid it has been found advantageous to incorporate an alkali metal or alkaline earth metal carboxylate in the process. Suitably sodium or lithium carboxylates may be used; for example when HX is acetic acid, lithium or sodium acetate may advantageously be incorporated in the reaction mixture. The concentration of the alkali metal or alkaline earth metal carboxylate is preferably in the range 0.1 to 2 molar.

The nature of the groups R', R", R''' and R'$^v$ is not important as the process is essentially the reaction of the group >C=C=C<. R', R", R''' and R'$^v$ can therefore represent a wide variety of substituent groups provided that they do not unduly influence the nature of the group >C=C=C< and are not of such a size as to sterically hinder the reaction of the group.

R', R", R''' and R'$^v$ are suitably aliphatic, cycloaliphatic or aromatic groups or hydrogen. Preferred aliphatic and cycloaliphatic groups are alkyl groups containing 1 to 12 carbon atoms, particularly 1 to 6 carbon atoms, for example methyl and isobutyl groups. Cyclohexyl is a preferred cycloaliphatic group. Aromatic groups which may be used include phenyl, tolyl and benzyl groups. Although R', R", R''' and R'$^v$ may contain olefinic unsaturation the product of the process when such substituent groups are present may comprise an increased number of compounds due to reaction of HX with the olefinic bond.

Suitable allene compounds for use in the process include allene itself, tetramethyl allene, monophenylallene, 1,1 dimethyl allene, 1,3 dimethylallene, trimethylallene, and the ethyl, n-propyl, isopropyl, n-butyl and isobutyl-allenes.

It is preferred to maintain a low concentration of the compound of formula

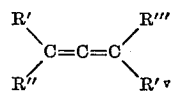

in the reaction solution, for example up to 10% by weight. This may be achieved by adding the compound continuously during the reaction. Where the compound of formula

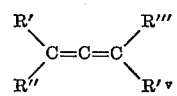

is gaseous under the reaction conditions, e.g. allene, it may conveniently be added continuously admixed with an inert gas such as nitrogen. In this case the partial pressure of the compound is preferably 5–30% of the total pressure.

The noble metals of Group VIII of the Periodic Table are ruthenium, rhodium, palladium, osmium, iridium and platinum. Of these palladium is preferred for use in the process.

Suitable salts of the noble metals are carboxylates, for example an acetate such as palladous acetate, and nitrates for example palladous nitrate. The salt may be in solution in the reaction medium or may be supported on an inert support such as alumina. The noble metal of Group VIII may form part of a complex. Suitable complexes are those comprising a metal salt complexed with one or more neutral ligands. Such ligands include phosphines such as triphenyl phosphine, phosphates such as triphenyl phosphate, phosphites such as triphenyl phosphite, and nitriles such as acetonitrile and benzonitrile. A particularly effective complex is the complex derived from a palladium salt such as palladous acetate or nitrate and benzonitrile. Such complexes may be formed separately or in situ.

The salt or complex of the Group VIII metal may be used at a concentration in the range of 0.001 to 2.0 molar, preferably in the range 0.01 to 0.1 molar.

The course of the reaction is as follows:

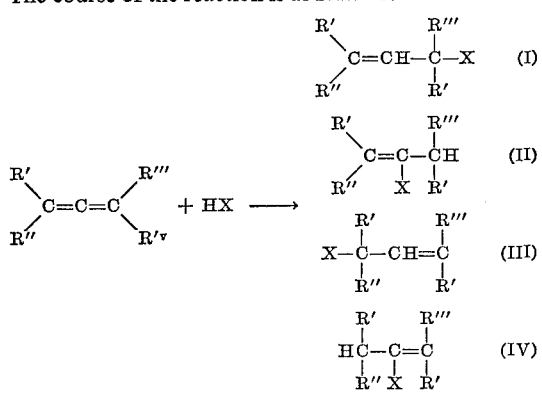

Additionally any one of I, II, III or IV may react with a molecule of

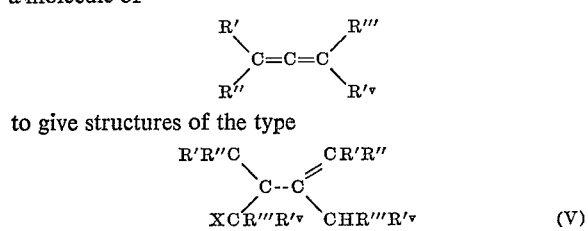

to give structures of the type $$\underset{XCR'''R'^v}{\overset{R'R''C}{\diagdown}}C\text{--}C\underset{CHR'''R'^v}{\overset{CR'R''}{\diagup}} \quad (V)$$

When HX is a carboxylic acid surprisingly high proportions of I and III, the allyl derivatives, are obtained. Thus when allene is reacted with acetic acid (X=acetate) at least three times as much allyl acetate (I) may be produced is isopropenyl acetate (II) and even higher to the extent that the isopropenyl acetate may even be present in only trace amounts.

The process may be carried out at temperatures in the range 20° to 180° C. preferably in the range 80° to 130° C.

Although the process is usually carried out at atmospheric pressure, elevated pressures may be used, particularly when one or other of the reactants is a gas under the reaction conditions. Suitable pressures are up to 10 atmospheres.

The process may be carried out in the liquid phase in an excess of the compound of formula HX or a solvent may be used. When the compound HX is an alcohol or carboxylic acid such as acetic acid, excess alcohol or acid may be used as solvent.

Solvents which may be used in the liquid phase form of the process include aliphatic hydrocarbons, for example pentane, hexane, octane or cyclohexane, aromatic hydrocarbons for example benzene, toluene or xylene, ethers for example diethyl ether, esters, for example dinonyl phthalate, and other well known solvents such as tetrahydrofuran, dioxane, dimethylacetamide, sulpholane, dimethyl sulphoxide, diglyme and benzonitrile. It will be noted that this list of inert solvents includes compounds, e.g. benzonitrile, capable of complexing with the noble metal. Such compounds are very effective solvents for use in the process.

The process may also be carried out in the vapour phase by passing the compound of formula HX, e.g. acetic acid, and compound of formula

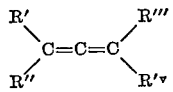

e.g. allene, over the catalyst deposited on an inert support such as alumina.

A modification of the process comprises incorporating in the reaction a redox system, which prevents precipitation of the nobel metal, particularly palladium, by reductive side reactions. Metal salts are preferred redox systems, particularly copper or iron salts, for example copper carboxylates such as copper acetate, copper nitrate, iron carboxylates and iron nitrate. Reduction of the noble metal to metallic form is prevented by the oxidising property of the redox system which is itself converted to its reduced form. The use of a redox system is particularly advantageous when HX is water and

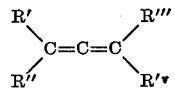

is allene, as the first formed allyl alcohol,

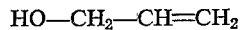

is oxidised under the reaction conditions to acrolein O=CH—CH=CH₂ a most valuable product. In this oxidation the noble metal (palladium is particularly suitable) is reduced but may be re-oxidised and retained in solution by the redox system.

The reduced form of the redox system may be reoxidised by providing molecular oxygen in the process, the regeneration of the redox system being carried out either in situ or in a separate reaction stage. As water is formed in the regeneration of the redox, and as water can be a reactant in the process, it is important that the need to regenerate the redox system should be kept to a minimum. A minor amount of water may be tolerated however, for example up to 5% by weight of the reaction medium.

The products of the process are of use as polymerisable monomers and chemical intermediates.

The invention will now be further described with reference to the following examples:

EXAMPLE 1

Allene was passed into a solution comprising 0.6 gram palladous acetate, 1 ml. benzonitrile and 5 mls. acetic acid for 24 hours at a temperature between 25° and 90° C., 200 to 225 mls. of allene were absorbed.

The proportion of allyl acetate to isopropenyl acetate in the solution at the end of the experiment was determined by vapour phase chromatographic analysis.

The ratio of allyl acetate to isopropenyl acetate was 4 to 1.

EXAMPLE 2

Allene was passed into a solution comprising 0.2764 gram of palladous acetate, 0.5 ml. of benzonitrile and 5 mls. of acetic acid for 5 hours at a temperature of 90° C. 500 mls. of allene were absorbed.

The amounts and proportion of allyl acetate and isopropenyl acetate in the solution remaining at the end of the experiment were again determined by vapour phase chromatography.

0.28 gram allyl acetate and 0.056 gram is isopropenyl acetate were detected.

Ratio of allyl acetate to ispropenyl acetate: 5 to 1.

EXAMPLE 3

Allene was passed into a solution comprising 0.1343 gram of palladous acetate, 0.5 ml. of benzonitrile, 0.9786 gram of sodium acetate and 20 mls. of acetic acid for 3 hours at a temperature of 90° C. 580 mls. of allene were absorbed.

The products of the reaction in the amounts shown at the end of the experiment were as follows:

|  | Gram |
|---|---|
| Allyl acetate | 0.25 |
| Isopropenyl acetate | 0.04 |
| 2-(acetoxy methyl)-3-methyl buta-1,3-diene | 1.2 |

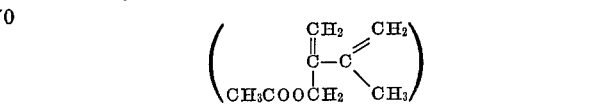

The yield of allyl acetate was 17 wt. percent.

The ratio of allyl acetate to isopropenyl acetate was 6.25:1.

EXAMPLE 4

Allene was passed into a solution comprising 0.1238 gram of palladous acetate and 20 mls. acetic acid for 1½ hours at a temperature of 120° C. 285 mls. of allene were absorbed.

The products of the reaction and their amounts were determined by vapour phase chromatography. They were:

|  | Gram |
|---|---|
| Allyl acetate | 0.24 |
| Isopropenyl acetate | 0.05 |
| 2-(acetoxymethyl)-3-methyl buta-1,3-diene | 0.6 |

The yield of allyl acetate was 27 wt. percent.
The ratio of allyl acetate to isopropenyl acetate was 4.8:1.

EXAMPLE 5

Allene was passed into a solution comprising 0.1244 gram of palladous acetate 0.1412 gram of triphenylphosphine and 20 mls. acetic acid for 3½ hours at a temperature of 110° C. 500 mls. of allene were absorbed.

The reaction mixture was again analysed by vapour phase chromatography with the following results:

|  | Grams |
|---|---|
| Allyl acetate | 0.12 |
| Isopropenyl acetate | 0.04 |
| 2-(acetoxymethyl)-3-methyl buta-1,3-diene | 1.1 |

The yield of allyl acetate was 9.5 wt. percent.
The ratio of allyl acetate to isopropenyl acetate was 3 to 1.

EXAMPLE 6

A mixture of 10% by volume allene in argon was passed into a solution comprising:

palladous acetate—0.28 gram
acetic acid—20 mls.
benzonitrile—0.1 ml.

The temperature was 100° C., the pressure atmospheric, and the reaction time 5 hours. During this period approximately 150 mls. of allene were absorbed.

At the end of the reaction the yields of the products were estimated by vapour phase chromatography. These were:

|  | Gram |
|---|---|
| 2-(acetoxymethyl)-3-methyl buta-1,3-diene | 0.18 |
| Isopropenyl acetate | 0.006 |
| Allyl acetate | 0.092 |

The yield of allyl acetate was 33 wt. percent.
The ratio of allyl acetate to isopropenyl acetate was 15:1.

EXAMPLE 7

A mixture of 10% by volume allene in argon was passed into a solution comprising:

palladous acetate—0.2715 gram
acetic acid—20 mls.
benzonitrile—0.14 ml.

The temperature was 85° C., the pressure atmospheric, and the reaction time 4½ hours.

At the end of the reaction the yields of the products were estimated by vapour phase chromatography. These were:

|  | Gram |
|---|---|
| 2-(acetoxymethyl)-3-methyl buta-1,3-diene | 0.12 |
| Isopropenyl acetate | 0.008 |
| Allyl acetate | 0.062 |

The yield of allyl acetate was 32.5 wt. percent.
The ratio of allyl acetate to isopropenyl acetate was 8:1.

The results in Examples 6 and 7 demonstrate the advantages to be gained by maintaining a low allene concentration.

EXAMPLE 8

A solution comprising:

acetic acid—100 mls.
palladous acetate—1.0148 gram
copper acetate monohydrate—0.9914 gram was refluxed (approximately 110° C.). Allene was bubbled slowly through the solution and samples were taken from the reaction vessel every few minutes. The allyl acetate concentration increased at a rate of 0.6 mole/litre/hour over the reaction period of 5½ hours.

At the end of the reaction the concentration of the products was estimated by nuclear magnetic resonance spectroscopy. The yields were:

|  | Grams |
|---|---|
| 2-(acetoxymethyl)-3-methylbuta-1,3-diene | 14.4 |
| Allyl acetate | 32.7 |
| Isopropenyl acetate—a trace. | |

The yield of alkyl acetate was 69.5 wt. percent.

EXAMPLE 9

A solution comprising:

Acetic acid—100 mls.
Palladous acetate—0.7142 gram
Copper acetate monohydrate—1.5144 gram was refluxed (approximately 110° C.). Allene was bubbled slowly through the solution and the allyl acetate removed continuously as it was formed. After 5 hours reaction time the yield of products as determined by vapour phase chromatography was:

|  | Grams |
|---|---|
| 2-(acetoxymethyl)-3-methyl buta-1,3-diene | 1.8 |
| Allyl acetate | 5.44 |
| Isopropenyl acetate—a trace. | |

The yield of allyl acetate was 75 wt. percent.

Examples 8 and 9 demonstrate the beneficial effect of a copper salt on the reaction.

What is claimed is:

1. Process for the production of an unsaturated organic compound having a single double bond which comprises the step of reacting a carboxylic acid with an allene compound of the formula:

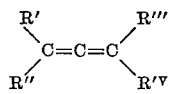

in the presence of a redox agent and a divalent salt of a noble metal of Group VIII of the Periodic Table or a neutral ligand complex of such salt, said ligand selected from the group consisting of triphenylphosphine, triphenylphosphite, acetonitrile and benzonitrile in which the carboxylic acid is a hydrocarbon aliphatic carboxylic acid containing up to 20 carbon atoms, or a hydrocarbon aromatic carboxylic acid and R', R'', R''' and R'$^\text{v}$ which may be the same or different are selected from the group consisting of alkyl containing 1 to 12 carbon atoms, cyclohexyl, phenyl, tolyl, benzyl and hydrogen, the reaction being carried out at a temperature of at least 20° C. and the noble metal of Group VIII being present in a concentration of up to 2.0 molar.

2. The process of claim 1 in which the carboxylic acid is selected from the group consisting of a hydrocarbon aliphatic carboxylic acid containing 1 to 20 carbon atoms, benzoic acid and phthalic acids.

3. The process of claim 2 in which the carboxylic acid is an aliphatic carboxylic acid containing 1 to 20 carbon atoms and an alkali or alkaline earth metal carboxylate is present.

4. The process of claim 3 in which the aliphatic carboxylic acid is acetic acid, the alkali metal carboxylate is lithium or sodium acetate and copper acetate is present.

5. The process of claim 1 in which any one of R',R'',R''' and R'$^v$ is an alkyl group containing 1 to 12 carbon atoms, a phenyl group or hydrogen.

6. The process of claim 5 in which the compound of formula

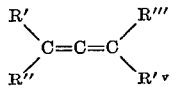

is allene.

7. The process of claim 6 in which the concentration of the allene compound in the reaction solution is not greater than 10% by weight.

8. The process of claim 1 in which the redox system is a copper or iron salt.

9. The process of claim 1 in which molecular oxygen is present.

10. The process of claim 1 in which the noble metal of Group VIII is palladium.

11. The process of claim G in which the salt of the noble metal of Group VIII is a carboxylate or a nitrate.

12. The process of claim 1 in which a solvent selected from the group consisting of aliphatic hydrocarbons, aromatic hydrocarbons, ethers, esters, tetrahydrofuran, dioxane, dimethylacetamide, sulpholane, dimethyl sulphoxide, diglyme and benzonitrile is present.

References Cited

UNITED STATES PATENTS

| 3,221,045 | 11/1965 | McKeon et al. | 260—497 |
| 3,346,623 | 10/1967 | Young | 260—497 |

FOREIGN PATENTS

| 969,017 | 9/1964 | Great Britain | 260—497 |
| 615,596 | 9/1962 | Belgium | 260—497 |

LORRAINE A. WEINBERGER, Primary Examiner

V. GARNER, Assistant Examiner

U.S. Cl. X.R.

260—465.3, 475, 476, 581, 583, 585, 597, 603, 611, 612, 614, 615, 617, 641